No. 761,979.

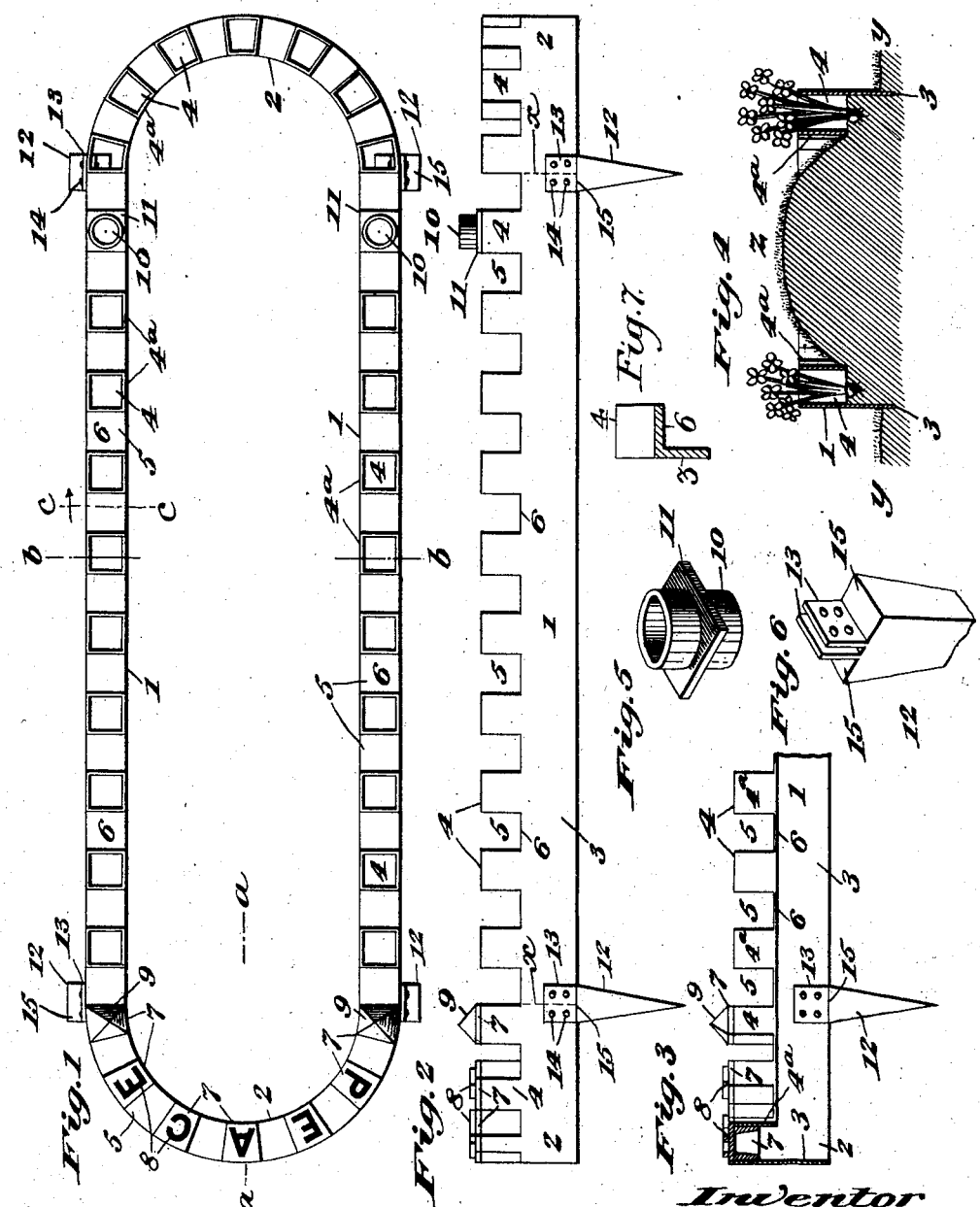

Patented June 7, 1904.

UNITED STATES PATENT OFFICE.

WILLIAM T. MOYLAN, OF CINCINNATI, OHIO.

MOUND EDGING OR FRAMING FOR GRAVES.

SPECIFICATION forming part of Letters Patent No. 761,979, dated June 7, 1904.

Application filed August 10, 1903. Serial No. 168,989. (No model.)

*To all whom it may concern:*

Be it known that I, WILLIAM T. MOYLAN, a citizen of the United States of America, and a resident of Cincinnati, in the county of Hamilton and State of Ohio, have invented certain new and useful Improvements in Mound Edging or Framing for Graves, of which the following is a specification.

This invention relates to certain improvements in that class of supporting frames or borders which are adapted for use in connection with grave-mounds for conspicuously marking the same and also for protecting them from being flattened down or washed away; and the object of the invention is to provide a device of this character of a simple and inexpensive nature and of a strong and durable structure which shall be capable of manufacture in either a very plain or a very ornamental form.

The invention consists in certain novel features of the construction, combination, and arrangement of the several parts of the improved grave-mound edging or skirting frame, whereby certain important advantages are attained and the device is made simpler, cheaper, and otherwise better adapted and more convenient for use than various other similar devices heretofore in use, all as will be hereinafter fully set forth.

The novel features of the invention will be carefully defined in the claims.

In the accompanying drawings, which serve to illustrate my invention, Figure 1 is a top plan view showing a grave-mound edging or supporting border or skirt embodying my improvements, and Fig. 2 is a side elevation of the same. Fig. 3 is a vertical partial section taken through one end portion of the device in the plane indicated by line $a\,a$ in Fig. 1. Fig. 4 is a vertical section taken transversely through the device in the plane indicated by line $b\,b$ in Fig. 1 and showing the device applied to a grave-mound in position for use. Fig. 5 is a perspective detail view showing a form of removable flower-pot or flower-container adapted for use in connection with the improved edging or skirting border or frame. Fig. 6 is a partial perspective view showing detached an anchoring stake or device adapted to be driven into the ground and forming part of my improved edging or skirting border or frame. Fig. 7 is a vertical section taken transversely through one side section of the device on the dotted line $c\,c$ in Fig. 1, showing more particularly the inturned flange.

As shown in the views, the device is formed of thin cast metal or other suitable material in an elongated shape, comprising side portions 1 1, adapted to extend lengthwise along the opposite sides of a grave-mound, and rounded end portions 2 2, to extend around the ends thereof, this construction being such that the device forms a continuous border or edging extended uniformly around the grave.

The device, formed of the side portions 1 1 and rounded end portions 2 2, is constructed with a vertical outer wall or rim 3, the lower edge portion of which when the device is in use is adapted to be buried beneath the surface of the ground surrounding the grave-mound, as shown in Fig. 4, and the upper portion of which extends perpendicularly upward around the mound, so as to surround and protect the same from being flattened down or washed away. The device also comprises a series of cells or receptacles 4 4, spaced apart in a uniform arrangement and disposed around the sides and ends of the skirting or edging frame or border, said cells or receptacles being formed integrally upon the side portions and end portions 1 and 2, respectively, whereat they are arranged, and being extended upwardly above the perpendicular walls 3 thereof. The cells or containers 4 4 are, as shown herein, made rectangular in cross-section, although they may be given other configurations—as, for instance, rounded, hexagonal, or of irregular form. The rectangular cells or containers 4 4 have integral inner walls $4^a$, whereby they are given a tubular form, the upper and lower ends of said cells being open.

5 5 indicate spaces or openings intervening the raised cells or containers 4, which spaces or openings extend downward to the level of the upper edge portion of the solid wall 3 of the device, at which point there is provided between each two cells 4 4 an inturned flange 6, integral with and extending between the wall 3 and such adjacent cells 4 4, as best shown in Fig. 7, and forming a bottom or floor for the corresponding space or opening 5. The widths of the flanges 6 and cells 4 are equal, so that the improved skirting or edging border or frame is made of uniform width throughout its whole extent and is given a uniform appearance.

The open-topped cells or containers 4 4 are adapted to receive various devices in the form of removable blocks 7, of metal, marble, or other appropriate material, and these removable blocks 7 may have their upper surfaces provided with letters, as shown at 8 8, or with ornamentations, as indicated at 9, where the top of the block is given a pyramidal form. When the lettered blocks are employed, they may be arranged in the cells or pockets 4 to make up or coin various words, inscriptions, epitaphs, names, legends, mottoes, emblems, &c. When the blocks 7 have ornamental top portions, they may be disposed in any suitable or desirable way and may be used in connection with the lettered blocks to impart a highly-ornamental appearance to the device. The blocks 7 may also be made in the form of rounded cups or pots, as indicated at 10, these cups or pots having flanges 11, rested on the top edges of the cells or pockets 4 and being adapted to contain plants in a well-known way. When these cups or pots 10 are employed, it will be obvious that, owing to their being removably held in the cells or pockets, the plants contained in them may be propagated in hothouses and placed in the cells or pockets when in bloom and may be afterward removed from the cells or pockets and replaced by other cups or pots containing fresh plants. When desired, also, plants may be grown directly in the grave-mound within the open cells or pockets 4 4, as indicated in Fig. 4, it being evident that such plants will grow up from the tops of the cells, so that their blossoms will appear above the device, whereby a more beautiful effect is attained. The cells or pockets 4 also serve to receive stakes, such as are commonly driven at the sides of graves for the attachment of flags or other emblems and decorations, and such stakes when used will aid in anchoring the device in position; but in order to secure the device in place it is generally preferable to employ stakes of metal, such as shown at 12 in Figs. 1, 2, 3, and 6, having at their upper ends forks 13 13, spaced apart to receive between them the lower edge portions of the outer wall 3 of the border or frame. The stakes 12 are made wedge-shaped or pointed at their lower ends, so as to be readily driven or pressed into the ground, and at their upper ends they are provided with shoulders 15, whereon pressure may be exerted to drive the stakes into the ground. As shown herein, there are two of said stakes 12 near each end of the device.

If desired, the side portions 1 1 and end portions 2 2 of the improved border or frame may be integrally formed in one piece, and this construction will be appropriate for short graves; but in other cases the side portions 1 1 may be formed separately from one or both end portions 2 2, the point or points of separation being indicated by dotted lines at $x$ $x$ in Fig. 2, and when the portions 1 and 2 are thus separately formed they may be connected by the forks 13 of the stakes 12 and bulbs 14, as indicated in said Fig. 2.

In the use of the improved edging or border the lower edge portions of the outer wall or rim 3 thereof will be slightly sunk in the ground, as indicated in Fig. 4, the upper part of said wall or rim projecting, however, far enough above the ground to form an effective support for the sides of the grave-mound, which are thereby prevented from being washed down, so that a proper elevation of the central portion of the mound, as indicated at $z$, may be maintained. The device also prevents the soil from being washed away from the roots of plants growing along the sides of the mound and also serves to retain the moisture which would otherwise pass off, so that the plants upon the mound are kept alive with less care than where growing on grave-mounds unprovided with the improved skirting.

The device constructed according to my invention is of an extremely simple and inexpensive nature and is especially well adapted for use by reason of the readiness with which desired variations in ornamentation, inscriptions, &c., may be effected. It will also be obvious that the device is capable of considerable modification without material departure from the principles and spirit of the invention, and for this reason I do not wish to be understood as limiting myself to the precise form and arrangement of the several parts herein shown in carrying out my invention in practice.

Having thus described my invention, what I claim, and desire to secure by Letters Patent, is—

1. A device of the character described comprising an outer rim or wall, open-topped cells or pockets, integral with and extended above the wall and spaced apart and flanges integral with the wall and said cells or pockets and extended inwardly from the wall between the pockets and across the top of the device to the inner walls of said cells or pockets.

2. A device of the character described comprising an outer wall or rim and open-topped cells or pockets in combination with interchangeable cup-shaped blocks held in the cells or pockets and provided with flanges extended round them and rested on the upper edges of said cells or pockets.

3. A device of the character described comprising a vertical outer wall, a horizontal top wall extended inwardly from the upper edge of said outer wall and integral portions spaced apart from each other and extended upward above said top wall and having closed sides and open tops and bottoms and forming cells or pockets, substantially as set forth.

4. A device of the character described comprising lateral sections spaced apart but parallel with each other and end sections each having extremities abutting upon extremities of said lateral sections and extended across the space between the lateral sections at one end of the device, said lateral and end sections being separately formed and each consisting of an integrally-connected series of cells or pockets the tops of which are open, the cells or pockets of each section being spaced apart from each other and each section having between its cells or pockets horizontal inwardly-extended portions with upper surfaces below the tops of the cells or pockets and with ends integral with said cells or pockets.

Signed at Cincinnati, Ohio, this 6th day of August, 1903.

WILLIAM T. MOYLAN.

Witnesses:
MILTON S. POTTENGER,
JOHN ELIAS JONES.